(12) United States Patent
Novosad

(10) Patent No.: US 7,907,642 B2
(45) Date of Patent: Mar. 15, 2011

(54) METHOD OF ENHANCING A PROGRAM STREAM

(75) Inventor: Tibor Novosad, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1309 days.

(21) Appl. No.: 10/536,844

(22) PCT Filed: Nov. 26, 2003

(86) PCT No.: PCT/IB03/05444
§ 371 (c)(1),
(2), (4) Date: May 31, 2005

(87) PCT Pub. No.: WO2004/052014
PCT Pub. Date: Jun. 17, 2004

(65) Prior Publication Data
US 2006/0101371 A1    May 11, 2006

(30) Foreign Application Priority Data

Dec. 5, 2002 (EP) .................................... 02293010

(51) Int. Cl.
*H04J 3/12* (2006.01)

(52) U.S. Cl. .......................... 370/529; 370/442; 370/498
(58) Field of Classification Search ................... 370/529
See application file for complete search history.

(56) References Cited

U.S. PATENT DOCUMENTS 5,966,352 A * 10/1999 Sawabe et al. ................ 386/126
2001/0038746 A1 * 11/2001 Hughes et al. ................ 386/123

* cited by examiner

*Primary Examiner* — Huy D Vu
*Assistant Examiner* — Omer Mian

(57) ABSTRACT

A content comprises contiguous blocks containing a program stream and interleaved blocks containing interleaved program streams, wherein the program streams are divided into program units and are readable independently of one another, and the occurrence of consecutive interleaved blocks is forbidden. The content is enhanced as follows. Each program unit of the enhancement program stream is associated with a program unit of the original program stream. The enhancement program stream is interleaved in the content at the program unit level such that enhancement program units are as close as possible to the original program unit they are associated with. The occurrence of consecutive interleaved block is avoided; and the original program units point to the enhancement program units they are associated with.

8 Claims, 5 Drawing Sheets

METHOD OF ENHANCING A PROGRAM STREAM

FIELD OF THE INVENTION

The invention relates to a method of enhancing a content that comprises original program streams, by adjunction of at least one enhancement program stream associated with at least one of said original program streams.

The invention also relates to a computer program comprising instructions for implementing such a method, and an authoring system intended for executing such a program.

The invention also relates to a signal obtained by applying such a method, and to a data carrier storing such a signal.

The invention also relates to a device for reading such a signal.

The invention notably applies to contents that are compliant with the DVD Specifications for Read-Only Disc, part 3 Video Specifications, version 1.1, December 1997 (called DVD specifications in the following of the description).

For instance, it allows the enhancement of a video content so as to provide a high-definition video content.

BACKGROUND OF THE INVENTION

In the DVD specification, audio, video, sub-picture, and navigation data elementary streams are multiplexed at the pack level to form a program stream (called VOB—Video Object—in the DVD specification).

One solution to produce an enhanced content that complies with the DVD specification is to multiplex enhancement elementary stream(s) with the above-mentioned elementary streams at the pack level.

As the elementary streams are multiplexed at the pack level, it is not possible for the players to read only part of them.

Therefore, with such a solution, players will have to read all the data of an enhanced program stream in order to achieve de-multiplexing and recovery of the elementary streams.

It means that the enhanced program streams must comply with the transfer rate restrictions defined in the DVD specifications (table 5-2 for contiguous streams and annex K for interleaved streams) so as to be readable by any DVD compliant player.

As a consequence the upper limit of 10.8 Mbps (defined in table 5-2 of the DVD specifications) cannot be exceeded.

One of the objects of the invention is to propose a solution allowing to exceed this upper limit while permitting reading by any DVD compliant player.

SUMMARY OF THE INVENTION

The invention applies to any content that comprises contiguous blocks containing a program stream and interleaved blocks containing interleaved program streams, wherein the program streams are divided into program units and are readable independently of one another, and the occurrence of consecutive interleaved blocks is forbidden.

According to the invention:
each program unit of the enhancement program stream is associated with a program unit of the original program stream;
the enhancement program stream is interleaved in the content at the program unit level such that enhancement program units are as close as possible to the original program unit they are associated with, and the occurrence of consecutive interleaved blocks is avoided;
and the original program units point to the enhancement program units they are associated with.

The invention makes it possible to introduce the enhancement data to the content in the form of one or more enhancement program streams while avoiding the occurrence of consecutive interleaved blocks.

As the enhancement program streams are interleaved with the original program streams at the level of the program units, it is possible for players to skip them when reading.

Therefore players may either read the original program stream(s) only, or both the original program stream(s) and the enhancement program stream(s).

Consequently it is not necessary anymore to comply with the 10.8 Mbps transfer rate upper limit. Players that cannot achieve transfer rates higher than 10.8 Mbps will still be able to retrieve the original content. More recent players that can achieve higher transfer rates will be able to retrieve both the original content and the enhancement content.

In other words, the invention renders it possible to exceed the 10.8 Mbps upper limit while maintaining compatibility with existing players that cannot achieve higher transfer rates.

The feature claimed in claim 2 is advantageous because it requires less memory and it simplifies the playback implementation.

The feature of claim 3 is advantageous, especially when the enhancement program units are read before the associated original program units (and therefore have to be buffered until the associated original program units are read), because it minimizes the quantity of data to be buffered.

BRIEF DESCRIPTION OF THE DRAWINGS

These and other aspects of the invention are further described with reference to the following drawings.

DESCRIPTION OF A PREFERRED EMBODIMENT

The embodiment that will be described below relates to the DVD specification. This is not restrictive. The invention also applies to other types of content having a similar contiguous/interleaved structure in which the occurrence of consecutive interleaved blocks must be avoided.

In the DVD specification, program streams are called Video Objects (VOB) and program units are called Video Object Units (VOBU).

According to the DVD specifications, contents comprise contiguous blocks and interleaved blocks. In a contiguous block, Video Objects Units are stored in a contiguous manner.

Figure 1:
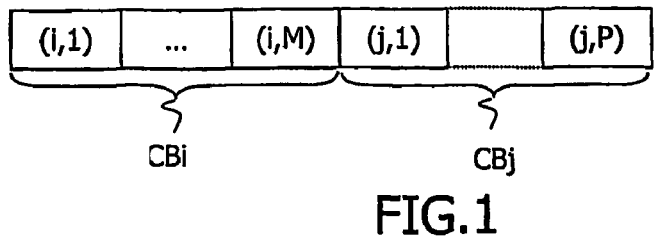
FIG. 1 is a schematic representation of the structure of a contiguous block.

FIG. 1 gives an example of two contiguous blocks CBi and CBj. The contiguous block CBi comprises a Video Object VOBi containing M Video Object Units (i,1), . . . , (i, M). The contiguous block CBj comprises a Video Object VOBj containing P Video Object Units (j,1), . . . , (j,P). The Video Object Units of the Video Objects VOBi and VOBj are stored consecutively one after the other.

In an interleaved block, Video Objects are divided into areas called interleaved units (ILVU), and the Video Objects are interleaved at the level of the interleaved units. According to the DVD specifications, an interleaved unit may comprise one or more Video Object Units (called VOBU). In the following, for simplification purposes, we will consider that an interleaved unit comprises only one Video Object Unit.

Figure 2:
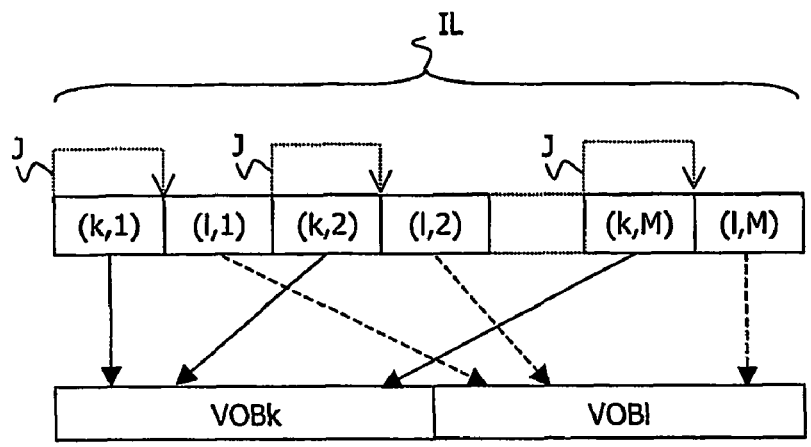
FIG. 2 is a schematic representation of the structure of an interleaved block.

FIG. 2 gives an example of an interleaved block IL comprising two Video Objects VOBk and VOBl. The Video Objects VOBk and VOBl comprise M Video Object Units (k,x) and (l,x) with x=1 to M respectively. The Video Object Units (l,x) are stored just behind the Video Object Units (k,x).

In an interleaved block, the reading device reads data sequentially while skipping data that do not require reading. For instance, in FIG. 2, arrows J indicate that the reading device is skipping the Video Object Units (l,x). In practice Video Object Units of interleaved Video Objects comprise a pointer, called reading pointer, pointing to the next Video Object Units in the same Video Object so as to allow skipping from one Video Object Unit to the next. Therefore, Video Objects can be read independently one from the other.

As indicated in paragraph K5 of the DVD specifications, the occurrence of consecutive interleaved blocks must be avoided in order to achieve a seamless playback of the content. It means that two interleaved blocks must be separated by at least one contiguous block.

Figure 3:
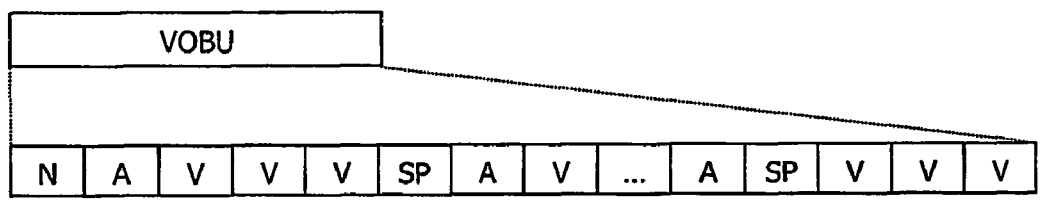
FIG. 3 is a schematic representation of a program unit according to the DVD specifications.

FIG. 3 shows the structure of a Video Object Unit. As represented in FIG. 3, a Video Object Unit VOBU comprises multiplexed packs including navigation packs N, audio packs A, video packs V and sub-picture packs SP.

The invention deals with enhancing a content by adding one or more enhancement Video Objects to the content. Each enhancement Video Object is associated with an original Video Object. During playback of the enhanced content both the original Video Object and the associated enhancement Video Object will have to be retrieved. To avoid slowness of the playback, the enhancement information has to be stored close enough to the original information it is associated with. This is achieved by interleaving the enhancement Video Object in the original block to which the associated original Video Object belongs.

Figure 4:
FIG. 4 is a schematic representation of an example of enhanced content according to the invention.
Figure 4:
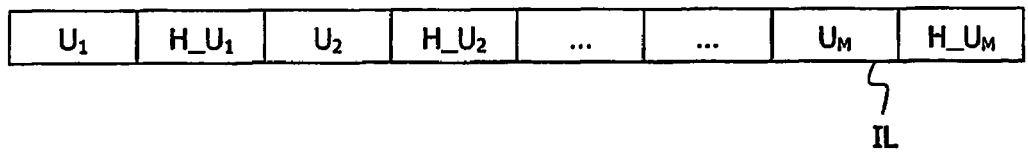

Contiguous original blocks are thus transformed into interleaved blocks. This is shown in FIG. 4. In FIG. 4 a contiguous block CB is represented which comprises one single Video Object split up into M original Video Objects Units $U_1, \ldots, U_M$. An enhancement Video Object Units $H\_U_i$ (i=1, . . . , M) is associated with each of the original Video Object Unit $U_1, \ldots, U_M$. The enhancement Video Object Units $H\_U_1, \ldots, H\_U_M$ are interleaved with the original Video Object Units $U_1, \ldots, U_M$. The resulting block IL is an interleaved block.

Figure 5:
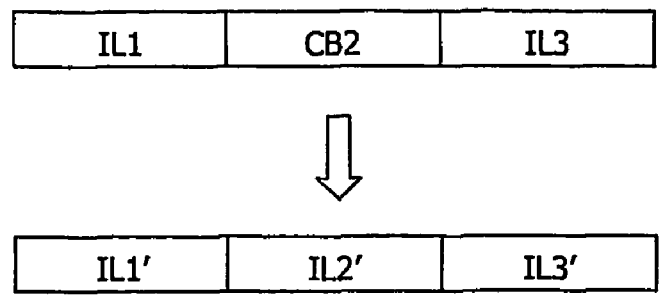
FIG. 5 is a schematic representation of an enhancement of a contiguous block that leads to an occurrence of consecutive interleaved blocks.

If the contiguous original block is adjacent to an interleaved block in the original content, transforming a contiguous original block into an interleaved block will lead to the occurrence of consecutive interleaved blocks in the enhanced content. FIG. 5 gives an example of such a situation. FIG. 5 shows a sequence S1 of three blocks. It comprises an interleaved block IL1, followed by a contiguous block CB2, followed by an interleaved block IL3. After enhancement, this sequence is transformed into a sequence S1' that comprises three consecutive interleaved blocks IL1', IL2' and IL3'.

Figure 6:
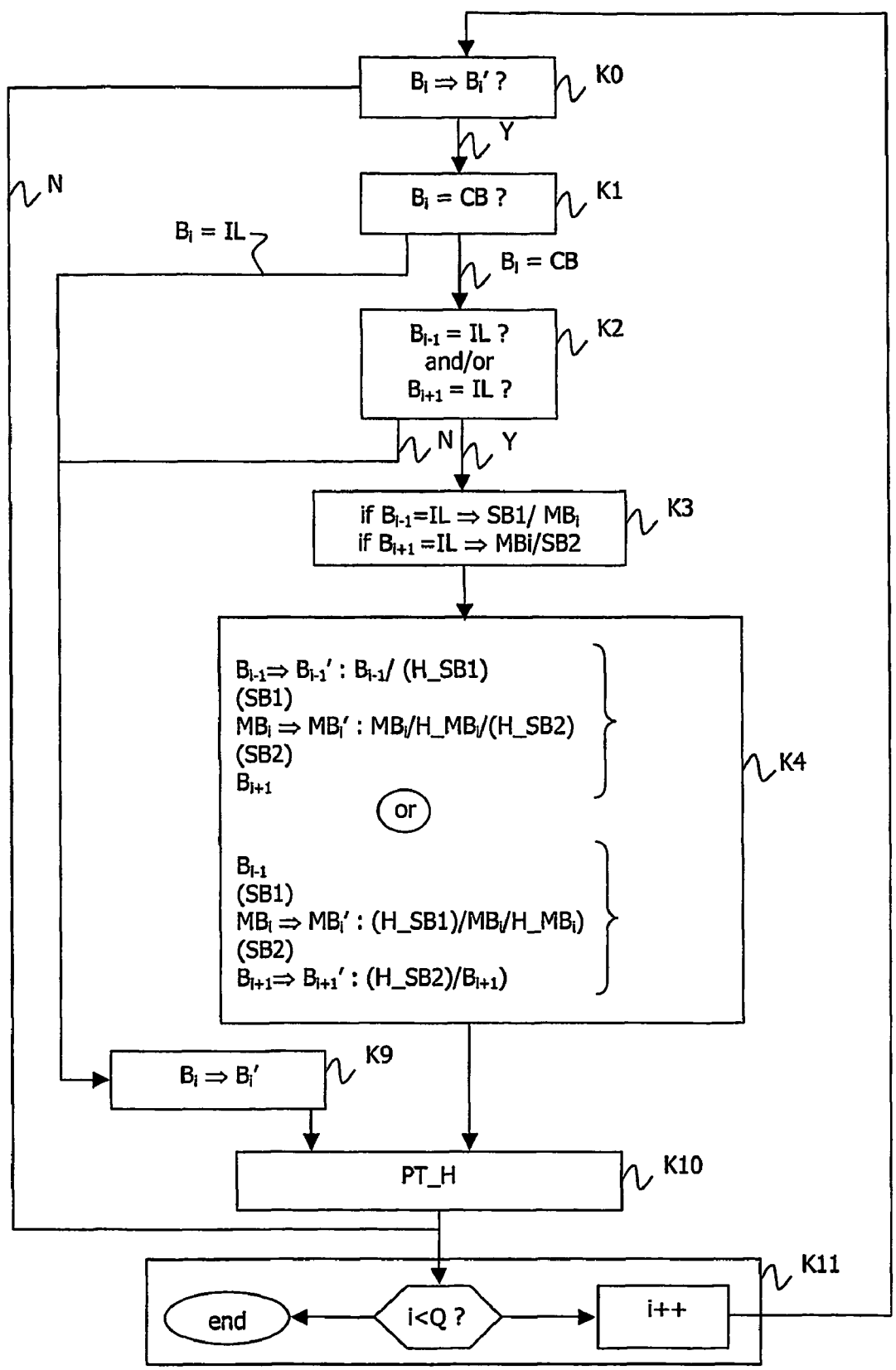
FIG. 6 is a block diagram of a method of enhancing a content according to the invention.

The invention proposes a method to enhance such a content through interleaving while avoiding occurrence of consecutive interleaved blocks. FIG. 6 is a block diagram representing the steps of a content enhancing method according to the invention. The original content is processed block by block. The algorithm described below with reference to FIG. 6 uses a three blocks sliding window $[B_{i-1}; B_i; B_{i+1}]$ centred on the block to be currently processed ($B_i$). The first block of the window ($B_{i-1}$) was processed in the previous iteration of the algorithm The third block of the window ($B_{i+1}$) will be processed in the next iteration of the algorithm. The current iteration deals with the enhancement of the central block $B_i$.

In FIG. 6, it is assumed that the original content comprises Q blocks (thus i varies from 1 to Q). For each iteration i of the algorithm, the following steps are executed:

In step K0 it is checked whether the original block $B_i$ is to be enhanced. If the original block $B_i$ is to be enhanced (arrow Y), then step K1 is executed. If the original block $B_i$ is not to be enhanced (arrow N) then step K11 is executed.

In step K1 it is checked whether the original block to be processed ($B_i$) is a contiguous block; if $B_i$ is a contiguous block ($B_i$=CB), step K2 is executed; if $B_i$ is an interleaved block ($B_i$=IL), step K9 is executed.

In step K2 it is checked whether interleaving the enhancement Video Object(s) into the original block Bi would lead to an occurrence of consecutive interleaved blocks in the content (this is the case when $B_{i-1}$ and/or $B_{i+1}$ are interleaved blocks); if the answer is yes (arrow Y), step K3 is executed; if the answer is no (arrow N), step K9 is executed.

In step K3 the original block $B_i$ is split into a main block MB; and:
  one pre-separation block SB1, if $B_{i-1}$ is an interleaved block,
  and/or one post-separation block SB2, if $B_{i+1}$ is an interleaved block.

After step K3, step K4 is executed.

In step K4 the enhancement is achieved by:
  interleaving of the enhancement Video Object units (H_MBi) associated with the original Video Object Units of the main block MBi, if any, into the main block, thereby transforming the contiguous main block MBi into an interleaved block MBi';
  interleaving of the enhancement Video Object Units (H_SB1/H_SB2) associated with the original Video Object Units of a contiguous separation block (SB1/SB2), if any, into an interleaved block that is adjacent to said contiguous separation block (which means either into IL1' or into MBi' for H_SB1, and either into MBi' or into IL2' for H_SB2),
  leaving the separation blocks SB1/SB2 unchanged and using them as separations between the interleaved block MBi' and the preceding/following interleaved blocks.

In step K9 the enhancement Video Object(s) are interleaved into the original block $B_i$, thereby generating an interleaved block $B_i'$.

Step K10 is executed after step K4 and after step K9.

In step K10 a pointer PT_H is added in the original program units to point to the associated enhancement program unit.

At step K11 the index i is incremented, and the next iteration of the algorithm is started.

It is to be understood that this method is applicable to the enhancement of one or more Video Objects of an original block.

The method depicted in FIG. 6 will now be flirter explained by way of two examples.

Figure 7:
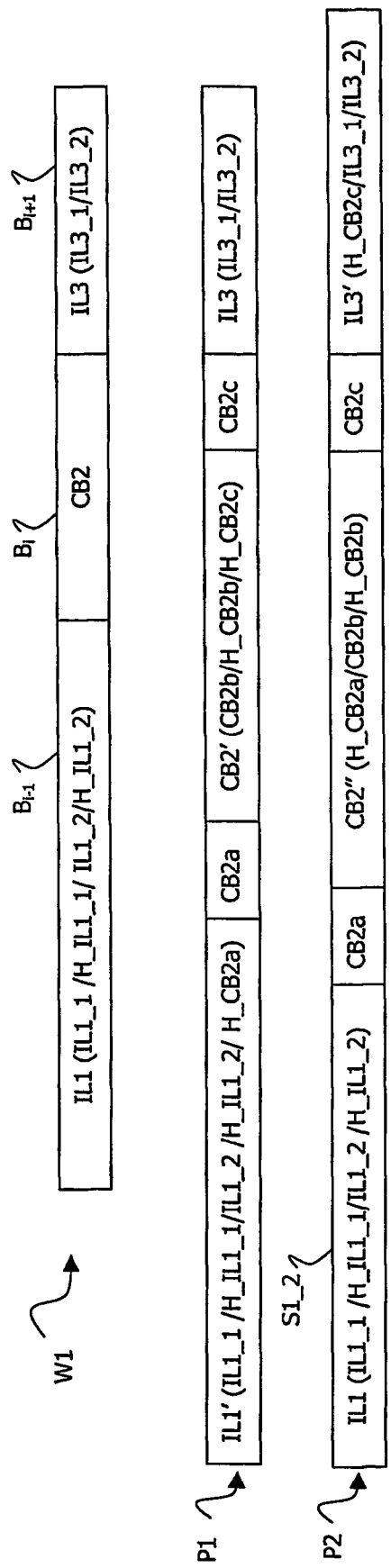
FIG. 7 is a first example of application of the method according to the invention.

In FIG. 7 it is assumed that in the sliding window W1:
the first block $B_{i-1}$ is an interleaved block (IL1) comprising two original Video objects IL1_1 and IL1_2, and the associated two enhancement Video Objects H_IL1_1 and H_IL1_2, said Video Objects being interleaved in the following order: IL1_1/H_IL1_1/IL1_2/H_IL1_2;
the second block $B_i$ is a contiguous block (CB2);
the third block $B_{i+1}$ is an interleaved block (IL3) comprising two original Video objects IL3_1 and IL3_2.

According to the invention, the contiguous block CB2 is split into three contiguous blocks: a pre-separation block CB2a, a main block CB2b, and a post-separation block CB2c. CB2b is enhanced with H_CB2b.

With a first implementation of the method of the invention (P1), the enhancement Video Objects H_CB2a and H_CB2c are interleaved into the interleaved block that precedes the contiguous separation blocks, which means that:
H_CB2a is interleaved in IL1, thereby generating a new interleaved block EL1' which comprises the interleaved Video Objects IL1_1/H_IL1_1/IL1_2/H_IL1_2/H_CB2a,
H_CB2c is interleaved with CB2b and H_CB2b, thereby generating an interleaved block CB2' which comprises the interleaved Video Objects CB2b/H_CB2b/H_CB2c.

The pre-separation block CB2a is inserted between the interleaved blocks EL1' and CB2'.
The post-separation block CB2c is appended after CB2'.

With a second implementation of the method of the invention (P2), the enhancement Video Objects H_CB2a and H_CB2c are interleaved into the interleaved block that follows the contiguous separation blocks, which means that:
the interleaved block IL1 remains unchanged;
H_CB2a is interleaved with CB2b and H_CB2b, thereby generating an interleaved block CB2" which comprises the interleaved Video Objects H_CB2a/CB2b/H_CB2b.
H_CB2c is interleaved at the beginning of the block IL3, thereby generating a new interleaved block IL3' which comprises the interleaved Video Objects H_CB2c/IL3_1/IL3_2.

In both cases the times sequence is maintained.

Figure 8:
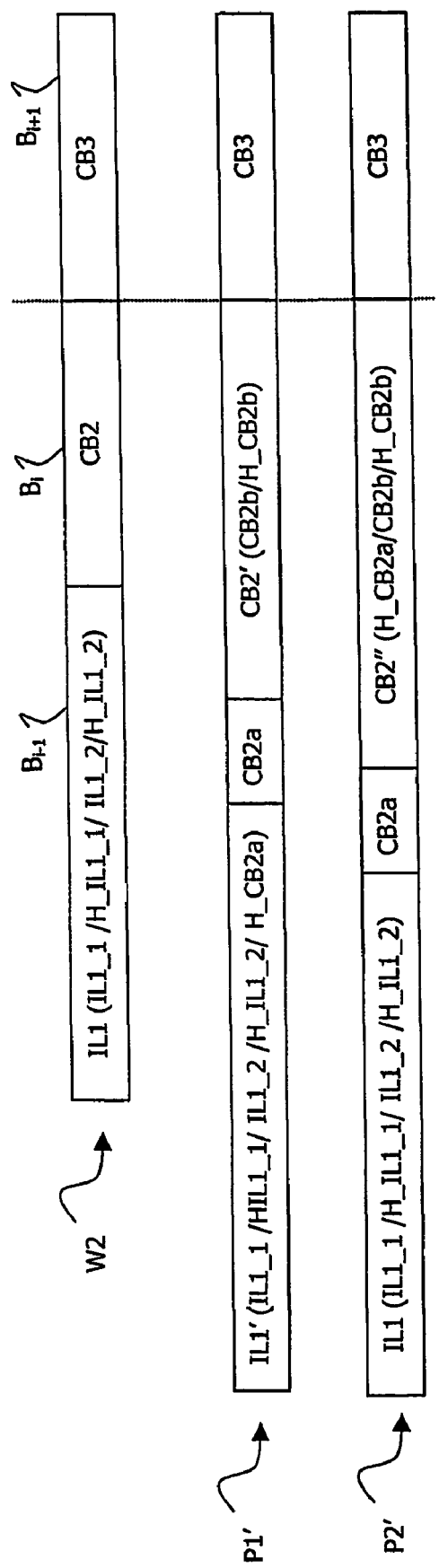
FIG. 8 is a second example of application of the method according to the invention.

In FIG. 8 it is assumed that in the sliding window W2:
the first block $B_{i-1}$ is an interleaved block (IL1) comprising two original Video objects IL1_1 and IL1_2 and the associated two enhancement Video Objects H_IL1_1 and H_IL1_2, said Video Objects being interleaved in the following order:
IL1_1/H_IL1_1/IL1_2/H_IL1_2;
the second block $B_i$ is a contiguous block (CB2);
the third block $B_{i+1}$ is a contiguous block (CB3).

According to the invention, the contiguous block CB2 is split into two contiguous blocks: a pre-separation block CB2a and a main block CB2b.
CB2b is enhanced with H_CB2b.

With a first implementation of the method of the invention (P1'), the enhancement Video Object H_CB2a is interleaved into the interleaved block that precedes the contiguous pre-separation block, which means that:
H_CB2a is interleaved in $B_{i-1}$, thereby generating a new interleaved block IL1' which comprises the interleaved Video Objects IL1_1/H_IL1_1/IL1_2/H_IL1_2/H_CB2a,
the interleaved block CB2' comprises the interleaved Video Objects CB2b/H_CB2b.

The pre-separation block CB2a is inserted between the interleaved blocks IL1' and CB2'.
The post-separation block CB2c is appended after CB2'.

With a second implementation of the method of the invention (P2'), the enhancement Video Object H_CB2a is interleaved into the interleaved block that follows the contiguous pre-separation block, which means that:
the interleaved block IL1 remains unchanged;
H_CB2a is interleaved with CB2b and H_CB2b thereby generating an interleaved block CB2" which comprises the interleaved Video Objects H_CB2a/CB2b/H_CB2b.

The contiguous blocks are split at the level of the Video Object Units.

The first implementation of the invention is advantageous because it requires less memory and it simplifies the playback implementation. In this first implementation, the enhancement data are stored ahead of the separation blocks they are associated with. Therefore it is advantageous to use separation blocks of minimal size. According to the DVD specifications, the separation blocks have to contain a Pre-unit (PREU) because they precede an interleaved block The minimal size of a Pre-unit corresponds to 1.5 seconds of video (see paragraph 2.4.67 of the DVD specifications).

Figure 9:
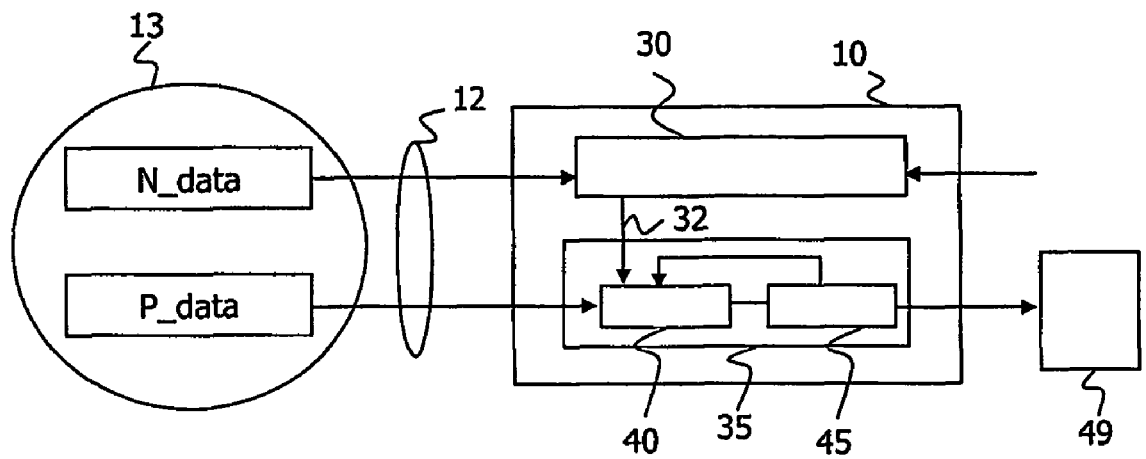
FIG. 9 is a block diagram of a reading device according to the invention.

A player 10 is represented in FIG. 9. The player of FIG. 9 is designed for reading a video signal 12 stored on a data carrier (a video disc 13 in this example). According to the DVD specifications, the video signal includes playback control data, called Navigation Data (N_data in FIG. 9) and data to be played back called Presentation Data (P_data in FIG. 9). The player 10 comprises a Navigation Manager 30 and a Presentation Engine 35. The Presentation Engine 35 follows instructions 32 issued by the Navigation Manager 30 to play back the Presentation Data P_data from the disc 13.

The Presentation Engine comprises an optical head 40 for reading the Presentation Data from the disc, and a processing unit 45 composed of software(s) and microprocessor(s) for processing the Presentation Data so as to output a signal to be displayed on a display 49.

When retrieving a Video Object, traditional players do not take into account the enhancement pointers PT_H that may be contained in it.

Players according to the invention are specifically designed for reading the enhancement pointer PH_T contained in an original Video Object Unit so as to retrieve the associated enhancement Video Object Unit. The original Video Object Unit and the associated enhancement Video Object Unit are then processed together so as to deliver an enhanced signal to be displayed. These operations are implemented by means of a specific software executed by the processing unit 45.

Figure 10:
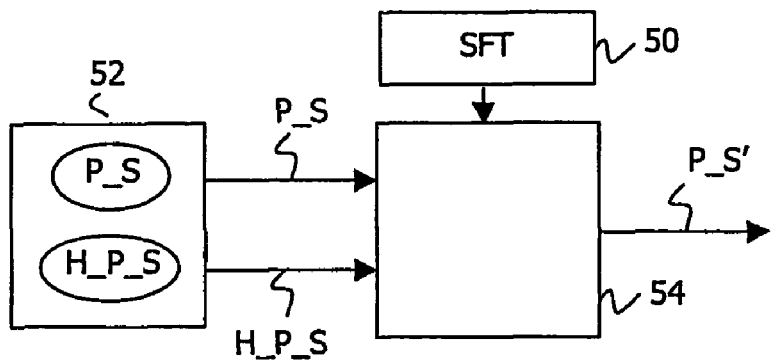
FIG. 10 is a block diagram of an authoring system according to the invention.

FIG. 10 shows an authoring system according to the invention. The authoring system of FIG. 10 comprises software memory means 50 storing a software SFT comprising instructions for implementing an enhancement method according to the invention, content storing means 52 for storing an original content P_S and enhancement data H_P_S, and processing means 54 for executing the software SFT so as to enhance the original content P_S with the enhancement data H_P_S and deliver an enhanced content P_S'.

With respect to the described enhancement method, authoring system, data carrier, signal, and reading device, modifications or improvements may be proposed without departing from the scope of the invention. The invention is thus not limited to the examples provided.

The word "comprising" does not exclude the presence of other elements or steps than those listed in the claims.

The invention claimed is:
1. A method of enhancing a content that comprises contiguous blocks containing a program stream and interleaved blocks containing interleaved program streams, said program streams being readable independently of one another, any occurrence of consecutive interleaved blocks in said content being forbidden, said method comprising a step of using an authoring system for processing an original block of said content so as to interleave at least one enhancement program stream associated with at least one original program stream of said original block, said original program stream comprising original program units and said enhancement program stream comprising enhancement program units, an original program unit being associated with an enhancement program unit, said processing step comprising:

a) if said original block is a contiguous block:

using the authoring system for checking whether interleaving of said enhancement program stream(s) into said original block would lead to an occurrence of consecutive interleaved blocks in said content, and in such a case, using the authoring system for splitting said original contiguous block into a main block and at least one contiguous separation block, using the authoring system for using said contiguous separation block(s) to separate said consecutive interleaved blocks, using the authoring system for interleaving the enhancement program units associated with the original program units of said main block, if any, into said main block, interleaving the enhancement program units associated with the original program units of a contiguous separation block, if any, into an interleaved block that is adjacent to said contiguous separation block, b) in other cases, using the authoring system for interleaving said enhancement program stream into said original block;

c) using the authoring system for adding a pointer in said original program units that points to the enhancement program unit it is associated with.

2. A method of enhancing a content as claimed in claim 1, wherein the enhancement program unit(s) associated with the original program unit(s) of a contiguous separation block is (are) interleaved into the interleaved block that precedes said contiguous separation block.

3. A method of enhancing a content as claimed in claim 1, wherein said separation block(s) comprise a number of original program units such that said contiguous separation block(s) have the smallest allowed size.

4. A non-transitory computer readable storage medium comprising a computer program comprising instructions embodied as physical variations of the media for implementing a method of enhancing a content as claimed in claim 1 when said program is executed by a microprocessor.

5. An authoring system comprising:

a non-transitory computer readable storage medium for storing a program comprising instructions for implementing a method as claimed in claim 1 of enhancing an original content with at least an enhancement program stream, and processing means for executing said program so as to provide an enhanced content.

6. A non-transitory computer readable storage medium storing a content obtained by applying a method of enhancing a content as claimed in claim 1, the storage medium being readable by processing equipment including a processor controlled by the content.

7. A non-transitory computer readable storage media comprising content represented by variations in physical properties of the media, the content being obtained by applying a method of enhancing a content as claimed in claim 1, the physical storage media being readable by processing equipment including a processor controlled by the content stored on the storage media.

8. A non-transitory computer readable storage media comprising content represented as variations in physical properties of the media, the content comprising:

contiguous blocks containing a program stream and interleaved blocks containing interleaved program streams, amongst said interleaved blocks, enhanced interleaved blocks comprising at least an original program stream comprising original program units and an associated enhancement program stream comprising enhancement program units, said original program units each comprising a pointer pointing to the enhancement program unit it is associated with, and amongst said contiguous blocks, separation blocks separating a preceding interleaved block and a following interleaved block, said separation blocks comprising one or more original program unit(s) of an original program stream, one of said preceding and following interleaved blocks comprising one or more enhancement program unit(s) associated with said original program unit(s), said original program unit(s) each comprising a pointer pointing to the enhancement program unit it is associated with, the storage media being readable by processing equipment including a processor controlled by the content stored on the storage media.

\* \* \* \* \*